(12) United States Patent
Signer et al.

(10) Patent No.: US 6,669,240 B1
(45) Date of Patent: Dec. 30, 2003

(54) UNLOADER TUBE PIVOT RING MECHANISM

(75) Inventors: Todd Neil Signer, East Moline, IL (US); Mark Charles DePoorter, East Moline, IL (US); Edwin Milton Gerber, Hooppole, IL (US)

(73) Assignee: Deere & Company, Moline, IL (US)

( * ) Notice: Subject to any disclaimer, the term of this patent is extended or adjusted under 35 U.S.C. 154(b) by 80 days.

(21) Appl. No.: 09/660,171

(22) Filed: Sep. 12, 2000

(51) Int. Cl.[7] ................................. F16L 27/00
(52) U.S. Cl. ................ 285/281; 285/278; 285/272; 285/280
(58) Field of Search ................ 285/272, 281, 285/280, 278, 379

(56) References Cited

U.S. PATENT DOCUMENTS

| | | | |
|---|---|---|---|
| 1,930,833 A | * 10/1933 | Barrett | 285/281 |
| 3,649,056 A | * 3/1972 | Frohlich | 285/276 |
| 3,844,632 A | 10/1974 | Ryczek | |
| 3,872,982 A | 3/1975 | Rowland-Hill et al. | |
| 4,093,087 A | 6/1978 | DeCoene | |
| 4,455,922 A | 6/1984 | Brelsford et al. | |
| 4,459,079 A | 7/1984 | Brelsford et al. | |
| 4,714,398 A | 12/1987 | Rohwedder | |
| 5,259,511 A | * 11/1993 | Pierson | 209/240 |
| 5,816,624 A | * 10/1998 | Smith | 285/276 |

FOREIGN PATENT DOCUMENTS

| | | |
|---|---|---|
| DE | 14 07 742 | 11/1968 |
| EP | 0 478 847 | 4/1992 |
| FR | 2 013 026 | 3/1970 |
| FR | 2 203 765 | 5/1974 |
| FR | 2 241 231 | 3/1975 |

OTHER PUBLICATIONS

New Holland, Model TX66 & TX68 Combine Parts Manual, two pages, date of publication—Jul. 1994, place of publication—unknown.

Claas, Lexion 480 Parts Manual, six pages, date of publication—Jun. 1996, place of publication—unknown.

Case, 2388 Axial–Flow Combine Parts Manual, six pages, date of publication—Oct. 1997, place of publication—unknown.

Deere & Company, 9650 Parts Manual, four pages, date of Internet publication prior to Mar. 2000.

Deere & Company, 9650STS Parts Manual, four pages, date of Internet publication prior to Mar. 2000.

* cited by examiner

*Primary Examiner*—Lynne H. Browne
*Assistant Examiner*—Giovanna M Collins

(57) ABSTRACT

A pivot mechanism for an unloader tube of a combine, having a pair of ultra high molecular weight pivot ring bushings which slide in contact with each other, are fixed to respective upper and lower portions of the unloader tube, and transmit weight of the unloader tube from the upper portion to the lower portion.

2 Claims, 3 Drawing Sheets

UNLOADER TUBE PIVOT RING MECHANISM

BACKGROUND OF THE INVENTION

The present invention relates to combine harvester unloader tube pivot mechanisms.

It is known to provide agricultural vehicles such as combines with a container for temporarily storing grain that the combine has harvested and threshed. Operatively connected with these containers are unloading tubes through which the grain from the container passes during grain unloading operations. An auger is typically positioned within the unloading tube for directing grain from the container into and through the unloading tube. As grain is unloaded from the combine's grain container through the unloading tube in this manner the grain is expelled into a truck or grain cart traveling next to the combine.

Many conventional unloading tubes include a generally upright lower portion operatively connected with and extending upwardly from a lower portion of the combine grain container. A generally horizontally extending portion of the unloader tube is operatively coupled with the upper end portion of the upright portion. Augers are typically positioned within the upright portion and horizontally extending portions of the unloader tube. A gearbox is often provided at the junction of the upright and horizontal portions of the unloader tube for operatively connecting the auger sections in the two portions of the unloader tube.

Conventional unloader tubes are adapted to pivot between two positions about the central axis of the upright portion of the tube. In a first position the horizontal portion of the unloader tube is positioned generally longitudinally with respect to the vehicle and is located in close proximity along the side of the vehicle. The unloader tube can be swung outwardly from this position about the central axis of the upright portion to a position whereat the horizontal portion of the tube extends generally laterally outwardly from the side of the combine. The outer end of the unloader tube is positioned relatively high in the air such that a grain truck or cart can be positioned under the end of the tube to receive the grain being propelled from the tube.

The unloader tubes tend to be relatively heavy structures, since they house the augers and bear a large amount of weight when they carry heavy amounts of grain during operation. The unloader tubes must therefore be braced to withstand these forces during operation. Conventional combines typically include an upper support structure above the tube's upright portion. The upper support mechanism helps keep the upright portion of the tube securely in place as it pivots and helps keep the upright portion from toppling over due to the weight of the tube, augers and grain within the tube. The upright portion of the unloader tubes are held firmly in position by a sturdy support ring structure that supports the lower portion of the tube and allows the unloader tube to pivot.

Conventional support ring structures typically include male and female cast ring members that form part of the unloader tube. The male cast ring is positioned below and is received by the female cast ring. The male and female cast rings bear against each other and pivot in contact with each other as the unloader tube is swung to its various positions. The female cast ring typically includes a means for lubricating the surfaces of the male and female cast rings that bear against each other. Conventional grease fittings and grease channels are provided for allowing grease to be applied to the bearing surfaces. Grain, dust and other small particles travelling upwardly in the unloader tube often become lodged in the grease channels and between the bearing surfaces. Such contaminants can wear down the male and female cast rings as the two parts pivot with respect to each other. The contaminants can also clog the lubrication system such that the bearing surfaces become dry and wear due to lack of lubrication. Therefore operators of such systems must frequently check and maintain the lubrication system to prevent excessive wear.

It would therefore be desirable to provide a mechanism that allows an unloader tube to pivot to its various positions, and which is not prone to wear due to contaminants. It would be desirable to provide a mechanism that does not require an operator to regularly check and maintain a lubrication system. It would be desirable to provide a mechanism that does not require lubrication, and therefore eliminates the need for a lubrication system.

SUMMARY OF THE INVENTION

The present invention provides a combine unloader tube pivot mechanism that includes upper and lower unloader tube portions positioned closely adjacent each other and which pivot with respect to each other to allow the unloader tube to pivot. Upper and lower ring-shaped pivot ring bushings are fixed for pivotal motion with respective upper and lower unloader tube portions. The upper and lower pivot bushings provide bearing surfaces through which weight from the upper unloader tube portion is transmitted to the lower unloader tube portion. The upper and lower pivot bushings are slidable in contact with each other as the unloader tube pivots to its various positions. The upper and lower pivot bushings are made of an ultra high molecular weight material. Mating shapes are formed in the upper and lower pivot bushings and the upper and lower unloader tube portions. These mating shapes block the upper and lower pivot bushings from pivoting with respect to the respective upper and lower unloader tube portions. The mating shapes according to the preferred embodiment include peg members formed in the pivot bushings and openings formed in the upper and lower unloader tube portions for receiving the peg members.

DESCRIPTION OF THE PREFERRED EMBODIMENT

Figure 1:
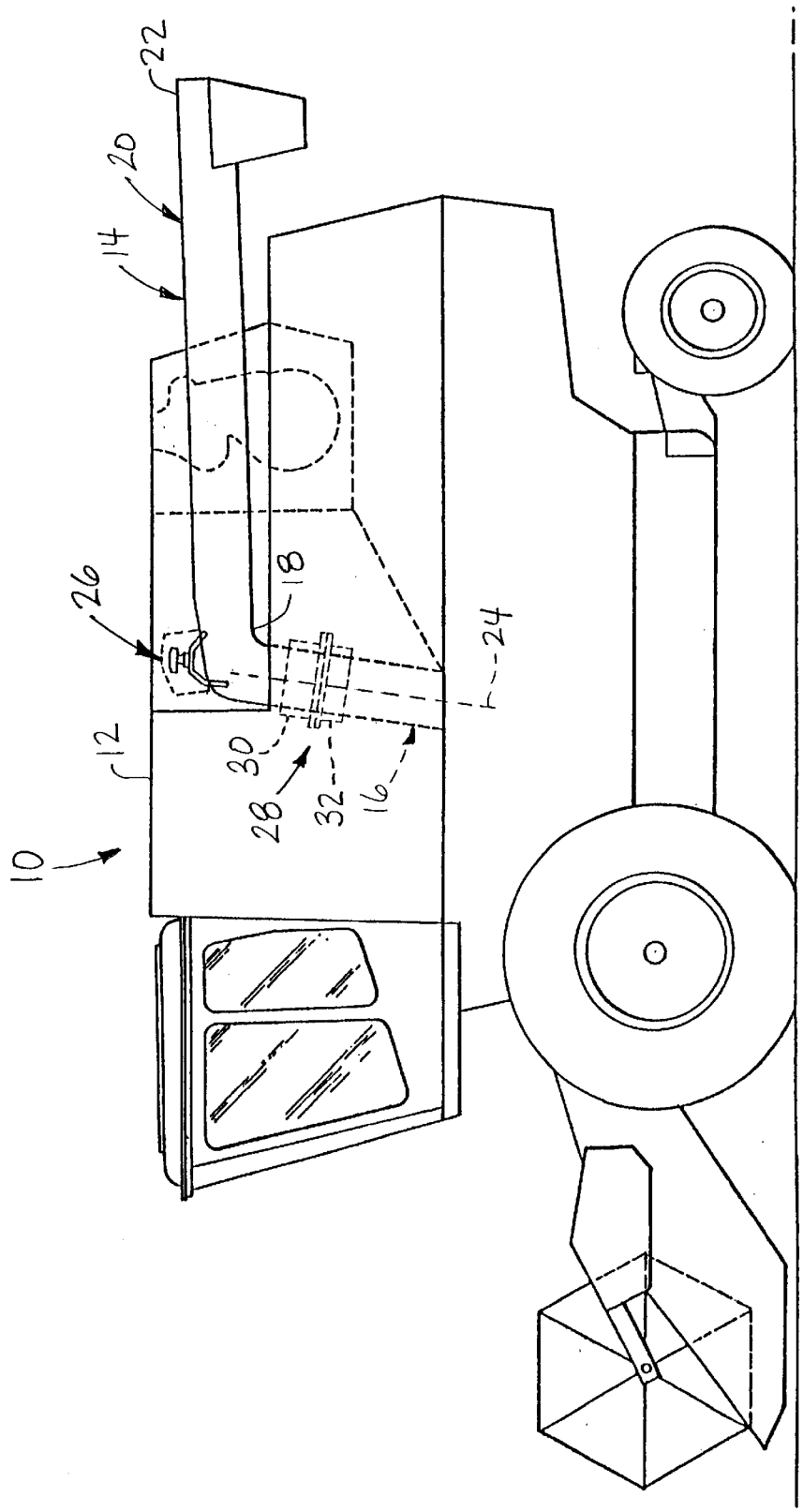
FIG. 1 is a schematic side view of a combine harvester having an unloader tube pivot mechanism according to the present invention.
Figure 2:
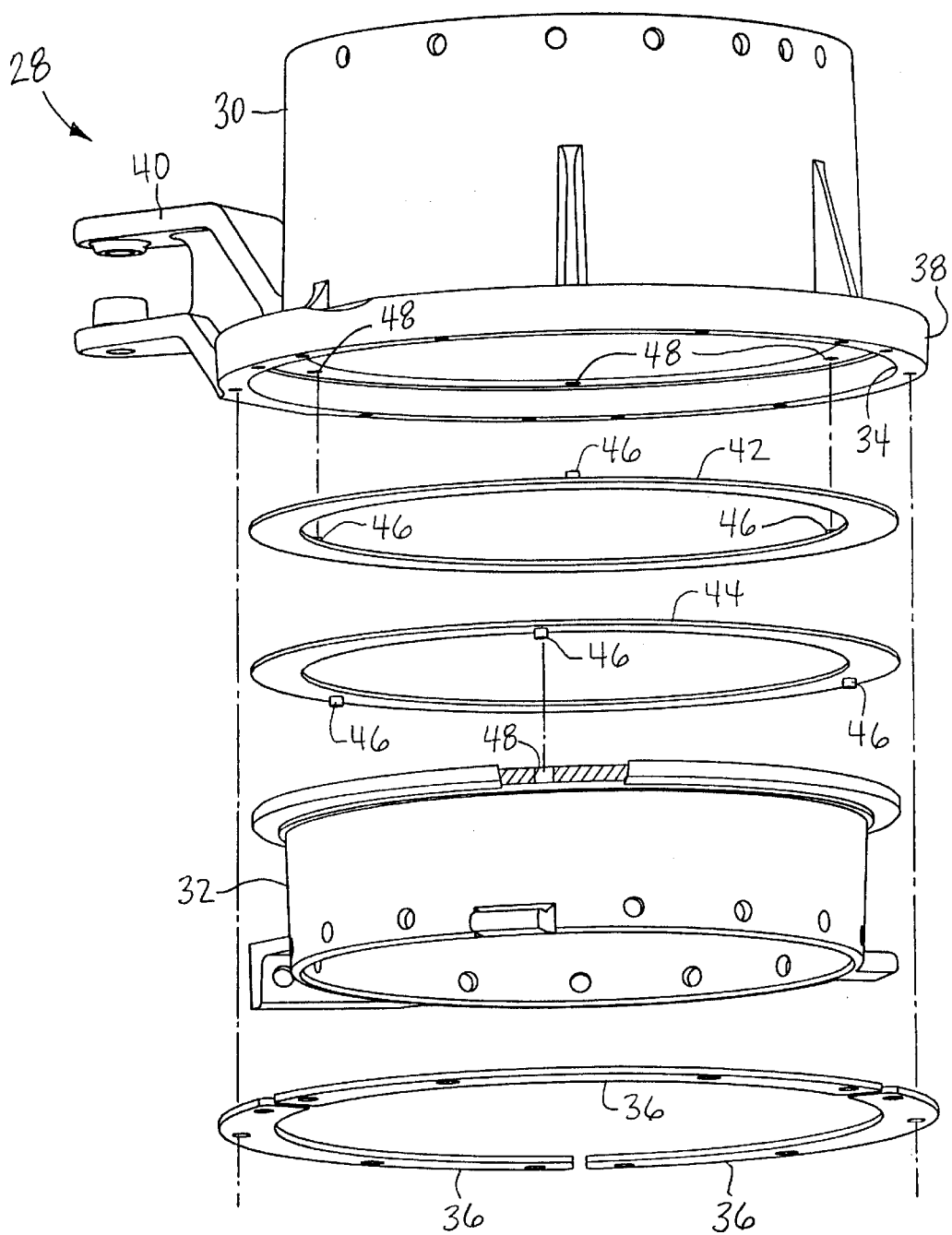
FIG. 2 is an exploded view of the unloader tube pivot mechanism according to the present invention.
Figure 3:
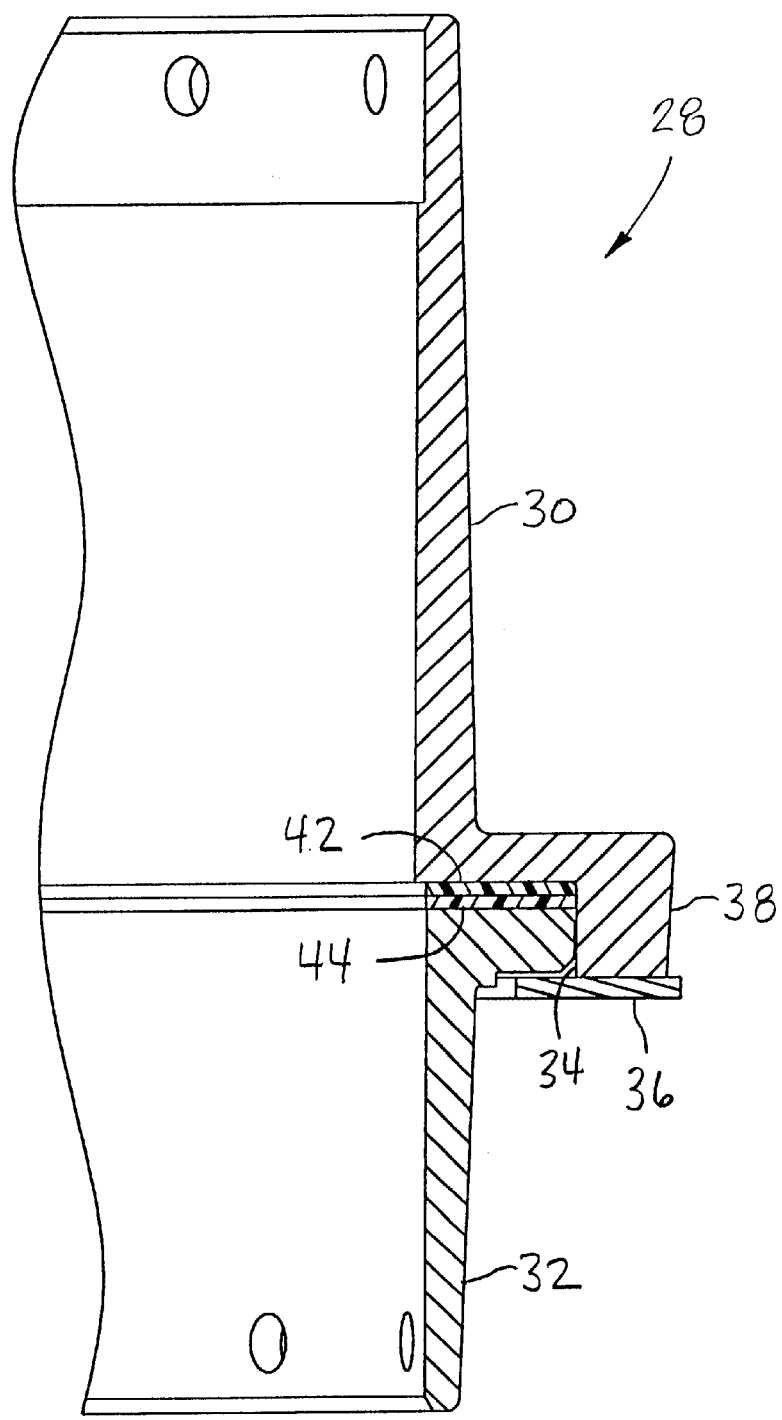
FIG. 3 is a sectional view of a portion of the unloader tube pivot mechanism shown in FIG. 2 and in accordance with the present invention.

Referring now to FIG. 1, there is shown a side view of a combine 10 capable of harvesting and threshing grain crops. The combine 10 includes a grain container 12 into which the threshed grain is directed. An unloader tube 14 is provided through which grain from the container 12 passes for emptying the contents of the container 12 into a grain truck or grain cart alongside the combine 10. The unloader tube 14 includes a generally upright lower portion 16 that is operatively connected with a bottom portion of the combine's grain tank 12. Grain from within the grain tank 12 is directed into the upright portion 16 of the unloader tube 14 and is directed upwardly therein by an auger positioned within the upright portion of the tube 14. The tube 14 makes a bend 18 at the upper end of the upright portion 16. An upper generally horizontal portion 20 of the tube 14 is connected to the bend portion 18 and extends generally horizontally when positioned in close proximity alongside the combine 10. A gearbox within the bend portion 18 transmits rotational energy from the auger within the upright portion 16 to an auger within the horizontal portion 20 of the tube 14.

The unloader auger tube 14 is pivotal from the position shown in FIG. 1 whereat the horizontal portion 20 is positioned in close proximity alongside the combine 10 to a position whereat the horizontal portion 20 extends laterally outwardly from the combine 10. As the unloader tube 14 is swung outwardly the end 22 of the tube 14 swings upwardly slightly, since the axis 24 of the upright portion 16 about which the tube 14 swings is at a slight angle to true vertical. This allows the end 22 of the tube 14 to be positioned above large grain trucks or grain carts during the unloading process.

The unloader tube 14 is relatively heavy due to the weight of the tube 14, the augers and the grain within the tube 14. To resist the forces associated with this large amount of weight, the tube 14 is provided with upper and lower support mechanisms. An upper support 26 according to the present invention is provided generally directly above the lower portion 16 of the tube 14. The upper support 26 helps retain the lower portion 16 of the tube 14 in its position as the tube 14 is swung about, and prevents the weight of the tube 14 from toppling the tube 14 over. At the lower end of the lower portion 16 of the tube 14 is a lower or ring support mechanism 28 according to the present invention that supports a large portion of the weight of the tube 14 during operation, and allows the lower tube 16 to pivot about its axis 24.

The lower ring support mechanism 28 includes an upper female portion 30 and a lower male portion 32 that form part of the unloader tube 14. The lower portion 32 fits within and is received by an inner diameter 34 of the upper female portion 30. Sector plates 36 are bolted or otherwise fixed to the underside of a flange 38 of the upper portion 30, and serve to securely confine the lower portion 32 in proper position proximate the upper portion 30. The upper portion 30 includes an arm 40 to which one end of a hydraulic cylinder or other appropriate mechanism can be coupled. The other end of the hydraulic cylinder is operatively fixed to the vehicle 10. An operator of the combine 10 can actuate the cylinder, which serves to shift the arm 40 about the axis 24 defined by the upper portion 30, thereby pivoting the upper portion 30 and the horizontal portion 20 of the unloader tube 14 between its various positions. The upper and lower portions 30, 32 therefore pivot with respect to each other as the hydraulic cylinder is actuated to thereby allow the unloader tube 14 to swing to its various positions.

The unloader tube pivot mechanism 28 according to the present invention includes upper and lower pivot ring bushings 42 and 44 that provide bearing surfaces that rub against each other as the upper and lower portions 30 and 32 pivot with respect to each other. The upper pivot ring bushing 42 is fixed for rotation with the upper portion 30, and the lower pivot ring bushing 44 is fixed for rotation with the lower portion 32. The pivot ring bushings 42 and 44 include peg members or protrusions 46 that are received by openings 48 defined in the respective upper and lower portions 30 and 32. The peg members 46 of the upper pivot ring bushing 42 and the openings 48 in the upper portion 30 define mating shapes that block the upper pivot ring bushing 42 from shifting with respect to the upper portion 30. The peg members 46 of the lower pivot ring bushing 44 and the openings 48 in the lower portion 32 define mating shapes that block the lower pivot ring bushing 44 from shifting with respect to the lower portion 32.

The pivot ring bushings 42 and 44 are made of an ultra high molecular weight polyethelene material. Ultra high molecular weight polyethelene material is a low friction composite or plastic type of material, however, other low friction materials such as nylon or urethene might also be used. When the pivot ring bushings 42 and 44 made of ultra high molecular weight material rub in contact with each other they tend not to experience excessive wear, even without lubrication. Therefore, the unloader tube pivot mechanism 28 according to the present invention generally eliminates the need for a lubrication system to be provided. The cost and complexity of the mechanism is thereby generally reduced. Furthermore, the present invention generally eliminates the task of the operator checking and servicing a lubrication system.

When contaminant materials such as particulate matter, grain and dust come in contact with the pivot ring bushings 42 and 44 such contaminants tend not to wear down the pivot ring bushings 42 and 44. It has been found that contaminants are generally expelled from between the pivot ring bushings 42 and 44 generally without causing the pivot ring bushings 42 and 44 to experience excessive wear. The pivot ring bushings 42 and 44 are generally unaffected by the intrusion of the foreign material such as crop or dust onto the bearing surfaces of the pivot ring bushings 42 and 44.

The pivot ring bushings 42 and 44 are shown in the drawings as circular in shape, but could also be provided by a plurality of sector shaped members that when assembled. generally form a circular shape.

What is claimed is:

1. An unloader tube pivot mechanism, comprising:

a pivotal unloader tube, upper and lower unloader tube portions closely adjacent each other and which pivot with respect to each other to allow the unloader tube to pivot, upper and lower pivot bushings fixed for pivotal motion with respective upper and lower unloader tube portions, said upper and lower pivot bushings having bearing surfaces in slidable contact with each other and through which weight from the upper unloader tube portion is transmitted to the lower unloader tube portion, said upper and lower pivot bushings being an ultra high molecular weight material, and mating shapes formed in the upper and lower pivot bushings and the upper and lower unloader tube portions, and said mating shades block the upper and lower pivot bushings from pivoting with respect to the respective upper and lower unloader tube Portions said mating shapes further comprise peg members formed in the pivot bushings and openings formed in the upper and lower unloader tube portions which receive said peg members.

2. An unloader tube pivot mechanism, comprising:

a pivotal unloader tube coupled with a combine harvester, upper and lower unloader tube portions closely adjacent each other and which pivot with respect to each other to allow the unloader tube to pivot, upper and lower ring-shaped pivot bushings fixed for pivotal motion with respective upper and lower unloader tube portions, said upper and lower pivot bushings having bearing surfaces in slidable contact with each other and through which weight from the upper unloader tube portion is transmitted to the lower unloader tube portion, said upper and lower pivot bushings being an ultra high molecular weight material, and mating shapes formed in the upper and lower pivot bushings and the upper and lower unloader tube portions, and said mating shapes block the upper and lower pivot bushings from pivoting with respect to the respective upper and lower unloader tube portions, wherein the mating shapes further comprise peg members formed in the pivot bushings and openings formed in the upper and lower unloader tube portions which receive said peg members.

* * * * *